US012699384B2

(12) United States Patent　　(10) Patent No.:　US 12,699,384 B2
Dehghanimohammadabadi　　(45) Date of Patent:　　Aug. 4, 2026

(54) DIGITAL TWIN MODELING AND OPTIMIZATION OF PRODUCTION PROCESSES

(71) Applicant: Northeastern University, Boston, MA (US)

(72) Inventor: Mohammad Dehghanimohammadabadi, Boston, MA (US)

(73) Assignee: NORTHEASTERN UNIVERSITY, Boston, MA (US)

( * ) Notice: Subject to any disclaimer, the term of this patent is extended or adjusted under 35 U.S.C. 154(b) by 1069 days.

(21) Appl. No.: 17/856,167

(22) Filed: Jul. 1, 2022

(65) Prior Publication Data

US 2023/0004149 A1　　Jan. 5, 2023

Related U.S. Application Data

(60) Provisional application No. 63/218,036, filed on Jul. 2, 2021.

(51) Int. Cl.
G05B 19/418　　(2006.01)
(52) U.S. Cl.
CPC ... G05B 19/41885 (2013.01); G05B 19/4188 (2013.01)
(58) Field of Classification Search
CPC .......... G05B 19/41885; G05B 19/4188; G05B 13/0265; G06N 20/00; G06Q 10/04; G06Q 50/04
See application file for complete search history.

(56) References Cited

U.S. PATENT DOCUMENTS

| | | | | |
|---|---|---|---|---|
| 12,265,381 | B1 * | 4/2025 | George, Sr. ........ | G05B 19/4188 |
| 2015/0161520 | A1 * | 6/2015 | Kaushal ........... | G05B 19/41885 |
| | | | | 700/121 |
| 2019/0130328 | A1 * | 5/2019 | Shukla ............. | G06Q 10/06398 |
| 2020/0012890 | A1 * | 1/2020 | Watson ................... | G06F 9/547 |
| 2020/0012900 | A1 * | 1/2020 | Walters .................. | G06F 30/20 |
| 2021/0264334 | A1 * | 8/2021 | Sirico .................... | G06Q 50/04 |
| 2022/0019451 | A1 * | 1/2022 | Crabtree .................. | G06F 8/30 |

OTHER PUBLICATIONS

Sehgal et al., "Deep Reinforcement Learning using Genetic Algorithm for Parameter Optimization", pp. 1-6 [retrieved from https://arxiv.org/pdf/1905.04100]. (Year: 2019).*
Les Jackson, "Consuming a REST API from C#" , pp. 1-23 [retrieved from https://dotnetplaybook.com/consuming-a-rest-api-from-c/]. (Year: 2019).*

* cited by examiner

*Primary Examiner* — Brian W Wathen
(74) *Attorney, Agent, or Firm* — Barclay Damon LLP

(57)　　　　ABSTRACT

A machine learning system and method for optimizing a production process. For instance, the method includes several steps as follows: selecting different values for a plurality of input parameters of a digital model of the production process for simulation; running the digital model using the different values for the plurality of input parameters and at least some of real-time data of the production process; determining a plurality of output parameters of the digital model; analyzing the plurality of output parameters; learning an optimized plurality of input parameters corresponding to the plurality of output parameters; and programming the production process to use the optimized plurality of input parameters to run the production process.

8 Claims, 4 Drawing Sheets

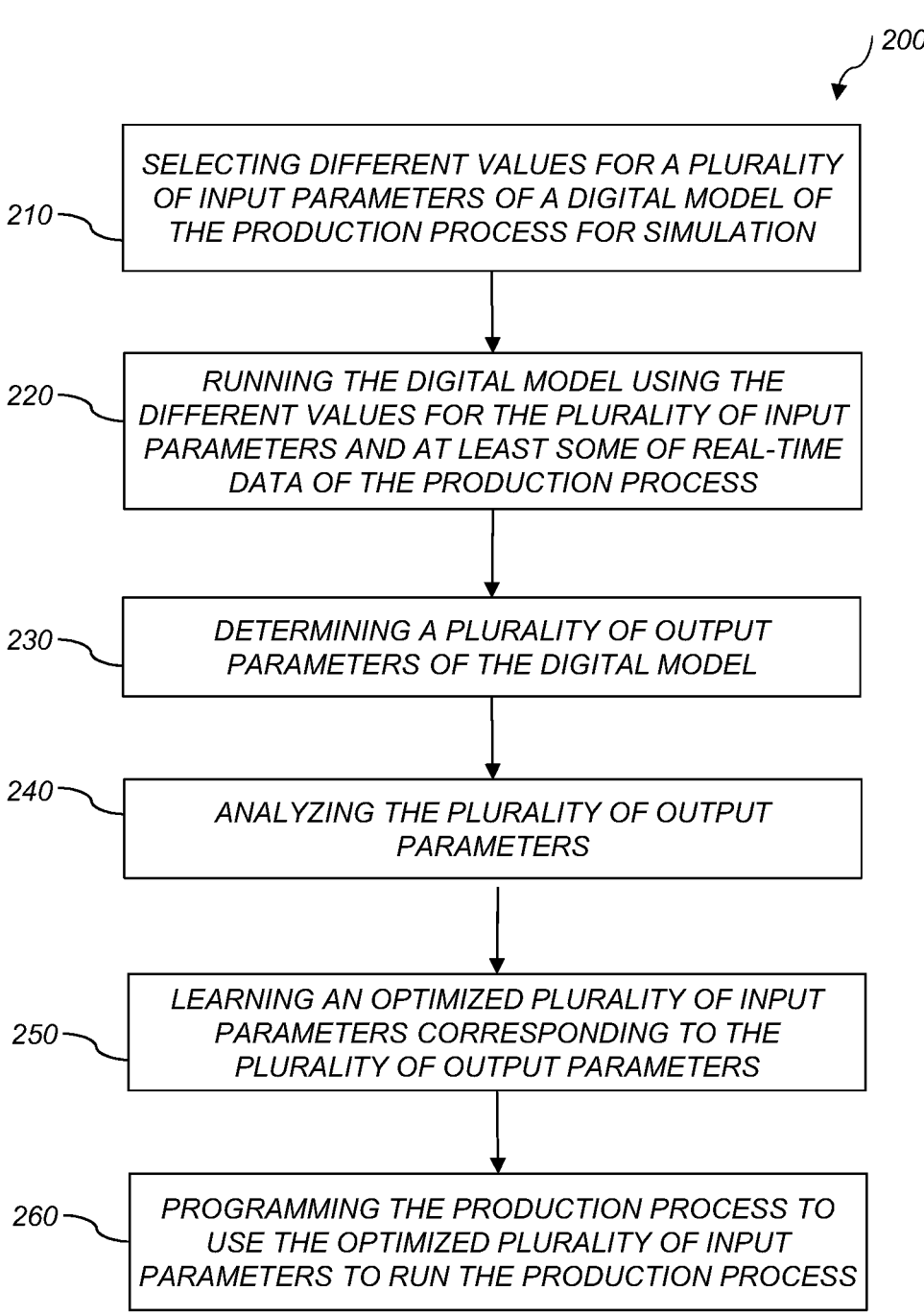

*200*

210 — SELECTING DIFFERENT VALUES FOR A PLURALITY OF INPUT PARAMETERS OF A DIGITAL MODEL OF THE PRODUCTION PROCESS FOR SIMULATION

220 — RUNNING THE DIGITAL MODEL USING THE DIFFERENT VALUES FOR THE PLURALITY OF INPUT PARAMETERS AND AT LEAST SOME OF REAL-TIME DATA OF THE PRODUCTION PROCESS

230 — DETERMINING A PLURALITY OF OUTPUT PARAMETERS OF THE DIGITAL MODEL

240 — ANALYZING THE PLURALITY OF OUTPUT PARAMETERS

250 — LEARNING AN OPTIMIZED PLURALITY OF INPUT PARAMETERS CORRESPONDING TO THE PLURALITY OF OUTPUT PARAMETERS

260 — PROGRAMMING THE PRODUCTION PROCESS TO USE THE OPTIMIZED PLURALITY OF INPUT PARAMETERS TO RUN THE PRODUCTION PROCESS

*FIG. 1B*

DIGITAL TWIN MODELING AND OPTIMIZATION OF PRODUCTION PROCESSES

CROSS REFERENCE TO RELATED APPLICATIONS

This application claims priority to U.S. Provisional Patent Application Ser. No. 63/218,036, filed on Jul. 2, 2021, the entirety of which is incorporated herein for all purposes.

BACKGROUND

In general, simulation packages are tools that are used to model real-life systems (i.e., systems for healthcare, manufacturing, service industries). One shortcoming of conventional simulation packages is that they run a simulation with a single parameter or set of parameters and are unable to perform enhanced analytics, such as machine learning. Another shortcoming of conventional simulation packages is that they do not have the ability to include actual process parameters in a meaningful way. Specifically, conventional simulation packages cannot be used with machine learning algorithms in an automated, iterative manner because the inputs to the simulation package must be manually input.

Further, conventional simulation solutions do not allow both digital twin modeling and optimization of production processes, and therefore merely provide the ability to manually determine the results of a simulated experiment that is entirely theoretical in nature.

Because many environments can benefit from process parameter optimization, a need exists for advanced simulation systems and software that can combine actual process information with simulation parameters to determine optimized process parameters.

BRIEF SUMMARY

Therefore, in one embodiment, a machine learning system for optimizing a production process is presented. For instance, the machine learning system includes a production planning system, a simulation system, and an analytics system. The production planning system includes real-time data of the production process. The simulation system is configured with a digital model of the production process. The digital model accepts a plurality of input parameters and producing a plurality of output parameters. The analytics system is configured to interface with the simulation system. The simulation system interfaces with the analytics system using an application programming interface. The application programming interface includes commands for providing the plurality of input parameters and receiving the plurality of output parameters. The analytics system communicates different values for the plurality of input parameters to the simulation system using the application programming interface. The simulation system runs the digital model using the different values for the plurality of input parameters received from the analytics system and at least some of the real-time data of the production process received from the production planning system. The simulation system communicates the plurality of output parameters to the analytics system. The analytics system analyzes the plurality of output parameters to learn an optimized plurality of input parameters corresponding to the plurality of output parameters. The production planning system is programmed to use the optimized plurality of input parameters learned using the digital model to run the production process.

In another embodiment, a machine learning method for optimizing a production process is presented. The machine learning method includes several steps as follows: selecting different values for a plurality of input parameters of a digital model of the production process for simulation; running the digital model using the different values for the plurality of input parameters and at least some of real-time data of the production process; determining a plurality of output parameters of the digital model; analyzing the plurality of output parameters; learning an optimized plurality of input parameters corresponding to the plurality of output parameters; and programming the production process to use the optimized plurality of input parameters to run the production process.

The above embodiments are exemplary only. Other embodiments as described herein are within the scope of the disclosed subject matter.

BRIEF DESCRIPTION OF THE SEVERAL VIEWS OF THE DRAWINGS

So that the manner in which the features of the disclosure can be understood, a detailed description may be had by reference to certain embodiments, some of which are illustrated in the accompanying drawings. It is to be noted, however, that the drawings illustrate only certain embodiments and are therefore not to be considered limiting of its scope, for the scope of the disclosed subject matter encompasses other embodiments as well. The drawings are not necessarily to scale, emphasis generally being placed upon illustrating the features of certain embodiments. In the drawings, like numerals are used to indicate like parts throughout the various views, in which:

FIGS. 1A & 1B are diagrammatic views of a machine learning framework in accordance with aspects of the disclosure;

Corresponding reference characters indicate corresponding parts throughout several views. The examples set out herein illustrate several embodiments, but should not be construed as limiting in scope in any manner.

DETAILED DESCRIPTION

The present disclosure relates to simulation systems in general, and to simulation systems that use digital twins and machine learning to optimize processes, such as production processes.

Figure 1A:
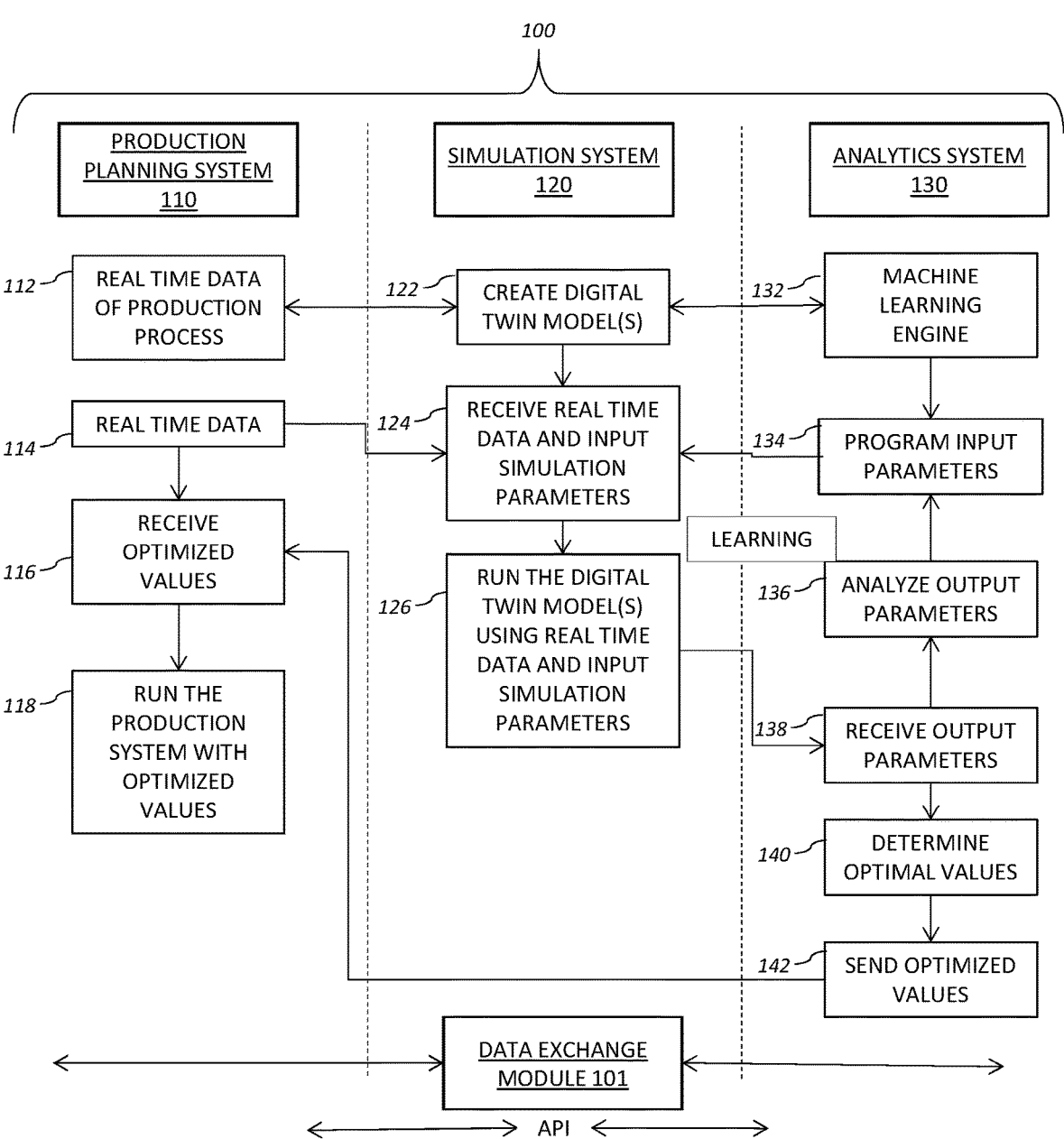

By way of example, FIGS. 1A & 1B are diagrammatic views of a machine learning framework. Specifically, FIG. 1A depicts a machine learning system 100. In the embodiment of FIG. 1A, machine learning system 100 includes a production planning system 110, a simulation system 120 and an analytics system 130.

In one implementation, the production planning system 110 at block 112 manages real-time data of a production process, for example, using data tables of a database. A Working Example of the production process is given in detail with respect to FIGS. 2-4.

Next, the analytics system 130 at block 132 includes a machine learning engine, for example, using one or more of the algorithms described below, including with respect to the Working Example of FIGS. 2-4. For instance, the simulation system 120 at block 122 includes the creation of a digital twin model of the physical production process managed by the production planning system 110. The production planning system 110 at block 114 sends real-time data of the production process to the simulation system 120. Next, the analytics system 130 at block 134 sends input parameters to the simulation system. These input parameters, along with the real-time data sent from the production planning system 110, are input into the simulation system For instance, and in the illustrated embodiment, the simulation system 120 at block 124 receives the real-time data and the input simulation parameters. Notably, this data is received programmatically using the applications programming interface (API) described herein, which is managed by the data exchange module 101. Next, the simulation system 120 at block 126 then runs the digital twin model using the real-time data and input simulation parameters received at block 124. This allows for a simulation to be run that is dependent both on real-time data of the actual production process along with changes in parameters done by the analytics system using machine learning. Next, the analytics system 130 at block 138 then receives the output parameter of the simulation from the simulation system 120.

The analytics system 130 at block 136 then analyzes the output parameter, and uses a machine learning algorithm such as the algorithms described herein to determine whether or not the production process has been sufficiently optimized. If not, the analytics system 130 at block 134 iteratively learns by programming new input parameters so that the simulation runs again at blocks 124-126.

If the analytics system 130 at block 140 determines that optimal values have been achieved, those optimal values may be sent to the production planning system for execution in the real physical process byte analytics system 130 at block 142. Then, the production planning system 110 at block 116 receives the optimized values, and stores them in the data base. Finishing this example, the production planning system 110 at block 118 then runs the production system with the optimized values of the production process.

In such a manner, and as explained in the flowchart of FIG. 1A, the digital twin model is used in a machine learning algorithm that tunes the process based on real-time production data, so that the process can be modified and optimized with the newly determined parameters. Again, a detailed Working Example of this technique is set forth below with respect to FIGS. 2-4.

Turning next to FIG. 1B, a machine learning method 200 is described. The machine learning method 200 includes several steps. The machine learning method 200 at block 210 selects different values for a plurality of input parameters of a digital model of the production process for simulation. In one embodiment, the real-time data of the production process is stored using data tables, and method further comprises linking to the data tables. The machine learning method 200 at block 220 runs the digital model using the different values for the plurality of input parameters and at least some of real-time data of the production process. The machine learning method 200 at block 230 determines a plurality of output parameters of the digital model. The machine learning method 200 at block 240 analyzes the plurality of output parameters. In one example, the method 200 applies a dispatching rule to optimize the simulation, the dispatching rule being one of a least setup time, earliest due date, largest priority value or largest attribute value rule.

The machine learning method 200 at block 250 learns an optimized plurality of input parameters corresponding to the plurality of output parameters. The machine learning method 200 at block 260 programs the production process to use the optimized plurality of input parameters to run the production process. In another example, the method iteratively optimizing the production process by iteratively running the digital model responsive to the different values for the plurality of input parameters. In a further example, the method includes learning the optimized plurality of input parameters corresponding to the plurality of output parameters using reinforcement learning. In yet another example, communicating is implemented using an application programming interface using a C# programming language. As an example of the algorithm used in method 200, a multi-objective genetic algorithm such as a non-dominated sorting genetic algorithm may be employed.

For example, data exchange module 101 of FIG. 1A includes the use of an Application Programming Interface (API). For instance, an API is developed, in one example in the programming language called C#, which connects Simio (a simulation software) with Python (an open-source programming language) in order to perform advanced data analytics such as experimentation, optimization, data mining, artificial intelligence machine learning, reinforcement learning, statistical analysis and data visualization, among many other analytics.

Continuing with data exchange module 101, the API connects the Simio simulation engine with the Python environment and provides an iterative connection between Python and Simio. Therefore, any algorithm in Python can iteratively (i) generate the simulation inputs, (ii) trigger the simulation experiments in Simio to obtain the performance results, and (iii) take the provided results in order to generate a new and better set of inputs. This cycle repeats until the inputs are optimized or satisfy the user's needs.

Simio is coded based on C#, therefore, to develop this API, IronPython can be used, which is an implementation of the Python programming language targeting the .NET Framework. This makes Simio accessible from Python to run simulation experiments. In addition, the simulation inputs can be modified remotely (without opening Simio) from Python and change the simulation model configurations.

With respect to simulation system 120 of FIG. 1A, advantageously the simulation model is suitable for: i) optimization by finding optimal settings of the simulation model, ii) data-table input optimization to 'optimize' the data-table inputs of Simio, iii) advanced output analysis of simulation results with statistical tools offered by Python, iv) visualize simulation output results and making dynamic/interactive dashboards by applying Python data visualization libraries, v) deploy artificial intelligence simulation modeling by coupling Simio with machine learning tools offered by Python, and vi) develop simulation-based reinforcement learning models by combining the simulation model in Simio with advanced deep reinforcement learning algorithms designed in Python. In addition, advanced simulation-optimization analysis can be conducted by developing optimization algorithms in Python and performing/running simulation experiments in Simio.

With respect to analytics system 130 of FIG. 1A, Reinforcement Learning (RL) models can be developed based on the foregoing simulation. For example, an RL algorithm can be coded in Python and then connected with Simio as an environment for the RL model. Linking simulation platforms with an additional analytical programing language, such as Python extends the simulation capability and makes its application enormous. The API is coded in C# and connects the Simio simulation engine with the Python environment. This API makes an iterative connection between Python and Simio. Therefore, any algorithm in Python can iteratively (i) generates the simulation inputs, (ii) triggers the simulation experiments in Simio to obtain the performance results, and (iii) take the provided results to generate a new/better set of inputs. This cycle repeats until the inputs are optimized or satisfy the user's needs.

Continuing with analytics system 130, with rapid advancements in Cyber-Physical manufacturing, Internet of Things, Simulation software, and Machine Learning algorithms, the applicability of Industry 4.0 is gaining momentum. The demand for real-time decision-making in the manufacturing industry has given significant attention to the field of Digital Twin (DT). One example includes creating a digital counterpart of the physical system based on enterprise data to exploit the effects of numerous parameters and make informed decisions. Based on that, this application described an exemplary simulation-optimization framework for the DT model of a Beverage Manufacturing Plant. A data-driven simulation model developed in Simio is integrated with Python to perform Multi-Objective optimization. The framework explores optimal solutions by simulating multiple scenarios by altering the availability of operators and dispatching/scheduling rules. The results show that simulation optimization can be integrated into the Digital-Twin models as part of real-time production planning and scheduling.

In the recent wave of Industry 4.0, Smart Factories and Intelligent Manufacturing have received significant attention from both researchers and industries. Smart Factories aim at achieving high adaptability, enhanced efficiency, increased productivity, and clearer visibility of operations. This requires generating, processing, and learning a tremendous amount of data-driven knowledge from different parts of the manufacturing system. There exists a growing body of literature focusing on integrating multiple technologies like IoT, simulation, optimization, and Machine Learning to create a Cyber-Physical manufacturing system. A complete real-time presentation of the state of the intelligent manufacturing system is a challenge; however, the emergence of Digital Twin (DT) has made it possible to solve this problem (He and Bai 2020). One example includes creating a virtual and digital counterpart of the physical system based on enterprise data to exploit the effects of numerous parameters and make informed decisions.

With respect to simulation system 120 of FIG. 1A, the concept of Digital Twin was put forward by Michael Grieves in 2002, which focused on product lifecycle management (Kritzinger et al. 2018). In the manufacturing setting, DT is perceived as a virtual simulation model of a physical system, which is applied to optimize the operational processes to achieve precise control over the whole assembly (He and Bai 2020). However, DT in the manufacturing industry is more than just a simulation model. It is an integration of smart digital machines, a simulation model, a network of widespread data, and the adoption of information/communication technologies by manufacturing systems. In order to fully exploit this potential, it is vital to realize this collaboration between humans, machines, environment in the simulation model, and the manufacturing process (Zheng et al. 2019).

Apart from the proven benefits, implementing a fully efficient DT can be inherently a complex process. This calls for the need of experimentation with several configuration settings, parameter testing, and an optimization framework to achieve the desired performance. This need is conventionally facilitated with the support of Discrete Event Simulation (DES) software applications. A central aspect of DES model is its capability to utilize data to simulate a real-life process and provide insights on various possible scenarios. This process can be real-time where the simulation model is integrated with an Enterprise Resource Planning (ERP) system. This need is conventionally facilitated with the support of Discrete Event Simulation (DES) software applications. A central aspect of DES model is its capability to utilize data to simulate a real-life process and provide insights on various possible scenarios. For the DT to replicate the true behavior of the physical process, it must incorporate detailed constraint model of the process. That includes all the equipment, labor, tooling, transportation and material along with the equipment and material characteristics driving the operational decisions. It is essential to factor in the business rules that regulate the operations such as inventory policies, labor policies, operating procedures, and transportation restrictions, for example. And finally, it must be able to capture the detailed day-to-day decision logic as applied by the planners, operators, and supervisors managing the process. A DES software is uniquely positioned to be able to model at this level of detail while also capturing the inherent variability present through the system. A DT can be fully generated and driven by Enterprise data. For example, an Enterprise Resource Planning (ERP) system can provide master data that defines all the resources in the system, along with material requirements and costing information. A Manufacturing Execution System (MES) can provide a definition of the resources on the factory floor, along with the current status of machine up-time, downtime, and work in process. Connecting the DT to such systems, will allow it to automatically adapt to changes in the environment such as additional equipment, new labor and skill requirements, new parts/SKUs, etc. The DT when connected to real-time data, would allow it to make predictive and perspective decisions based on the current status of the system.

Continuing with simulation system 130 of FIG. 1A, DES provides an environment to deploy manual or systemic experimentations to analyze multiple what-if scenarios. This enables decision-makers to test various process plans and scheduling techniques to obtain an optimized responsive planning, management, and decision making. This paper aims to propose a simulation-optimization (SO) framework to demonstrate its applicability for DT implementation. This framework takes advantage data-driven modeling where a simulation model is directly linked with an ERP system to imitate the manufacturing facility. Therefore, this application attends to the following:

Design of a simulation-optimization Digital Twin (SODT) framework.

Implement SODT by integrating a DES package an optimization algorithm.

Demonstrate the applicability of the proposed SODT in a manufacturing setting and provide insights for future developments.

In one implementation of the present disclosure, a simulation system 120, such as Simio, is integrated with an analytics system 130 that is programmed in Python. Simio is a powerful DES package and is written in C# on a .NET platform. The Simio API allows for flexible integration with other systems, which is important for the ability to not only connect to Enterprise systems but also allow for the ability to integrate optimization and artificial intelligence with the DT. The model can be connected to an external system in a number of ways, but most popular for a DT, is either with a direct database connection or with the WebAPI. For integrating optimization with the DT, the .NET platform and robust API makes Simio flexible enough to couple it with high-level programming language like Python. Python makes use of Python Package Index (PyPI) containing third party modules making it possible to interact with other platforms. It's ability to handle multiple data types, editing, writing and manipulating other software proves a key feature to execute combined operations. The extent of libraries available to perform statistical, mathematical and optimization calculation makes Python a great tool for simulation-optimization framework. These features of used software packages facilitates integration and provide a unique platform to optimize a simulated DT.

By way of overview of simulation systems 120, the following literature review represents an overview of applications and use-cases pertaining to simulation and digital twin models in the manufacturing industry, where a list of the literature references is set forth at the end of this application. Following the literature review, exemplary methodology is described as used to integrate SODT with a Beverage Production Plant. Results obtained by simulating multiple scenarios with continually optimized solution through an optimization algorithm are then further set forth.

Continuing with examples of simulation systems 120, the multifaceted definitions of DT prevailing in the manufacturing domain motivated (Zhang et al. 2021) to work on two specific research questions, 'What is the definition of Digital Twin in the scientific literature?' and 'What is its role within Industry 4.0?'. The authors put forward a comprehensive study with a focus on providing a solution to the problem from the point of view of model engineering and simulation. This indicates that DT is at the stage of rapid development where researchers start to explore real practices and technologies in the industry (Liu et al. 2020). According to Zheng et al. (2019), the ongoing extensive research on Cyber-Physical systems and Digital Twins has gradually become one of the key research directions of intelligent manufacturing. An extensive review published by He and Bai (2020), identified Production line and process simulation as one of the key development areas for DT for intelligent manufacturing. Al-Ali et al. (2020) asserts that the application of DT in manufacturing could help in higher flexibility, higher production, and better maintenance of the manufacturing and automation process, thus improving the overall operational efficiency. Santos et al. (2019), proposed the usage of DT for Manufacturing Executing System (MES) to obtain an optimum production schedule. The system consisted of an IoT platform, simulators, and user applications to provide changing inputs. Similarly, a decision support system for improving the order management process was proposed by Kunath and Winkler (2018). That proposed system is capable of generating a simulation model automatically using information from the Digital Twin of the manufacturing system. Another Digital Twin-based Cyber-Physical Production System was proposed by Ding et al. (2019) to optimize real-time monitoring, simulation, and prediction of manufacturing operations. Developing a combined simulation-optimization method with DT is another upcoming research topic popular in the manufacturing domain. Balderas et al. (2021) developed a Digital-Twin framework that integrates a metaheuristic optimization and a direct Simulink model for printed circuit boards (PCB) design and processing. The promising results obtained from the experiment show the benefits of integrating metaheuristic optimization into the Digital-Twin concept. Similarly, Liu et al. (2021) proposed a simulation-optimization scheduling platform for an aeroengine gear production workshop. The model was found efficient in optimizing scheduling by shortening both transit and waiting times within the production process.

Further, dynamic scheduling by continuous decision-making, predicting machine availability, bottleneck detection, and performance evaluation are common focus parameters among the reviewed studies. Zhang et al. (2021), demonstrates the use of optimization in DT to reduce the makespan and total tardiness by 14.5% and 87.1%, respectively, and increase the average utility rate by 14.9% of a hydraulic valve machining job-shop. Park et al. (2021) puts forward a novel production control model that applies DT and horizontal coordination with RL-based production control to a re-entrant job shop problem. Zhang et al. (2020) argues that it is difficult to find an effective simulation-based optimization method to solve the large-scale discrete optimization problems in digital twin shop floors. And to overcome these challenges, the authors propose an improved multi-fidelity simulation-based optimization method based on multi-fidelity optimization. The novel method makes use of heuristics algorithms to accelerate the solution space search integrated with a DES-based simulation optimization system. A joint simulation optimization and DT model to optimize stacked packing and storage assignment of the warehouse was proposed by Leng et al. (2019). The proposed model was able to maximize the utilization and efficiency of the large-scale automated high-rise warehouse product-service system. Park et al. (2021), puts forward a DES and Digital Twin framework for dispatching assistance in port logistics. Gyulai et al. (2020) makes use of DES model for the detailed representation of a complex shop-floor logistics system, employing automated robotic vehicles (AGV).

As discussed herein, in one embodiment, the use of simulation-optimization techniques combined with DT can be achieved by merging three (3) things:

A simulation model such as simulation system 120—visually replicating a physically happening process.

Real-time data processing, monitoring, and controlling capabilities, such as those provided by data exchange module 101 and production system 110.

Estimating future state capabilities using optimizing and machine learning embedded models by analytics system 130.

Accordingly, the present technique demonstrates the implementation of integrating a Simulation-Optimization Framework for a Digital Twin model, sometimes also referred to as an SODT or an SODT framework.

One example proposed SODT is an integrated simulation-optimization framework to enhance DT performance combining Python and Simio, discussed above. More specifically and as illustrated in FIG. 1A, this framework may include a combination of modules, namely i) data exchange module 101, ii) analytics system 130 including parameter optimization at block 140 as described above, and iii) simulation system 120. Data exchange module 101 is one element in the framework in which all components are connected together.

With respect to data exchange module 101, a first function of data exchange is to connect the simulation model with the ERP system. This connection enables the simulation model to capture the real-life changes in real-time and reflect them in the simulation model. All of the ERP information can be stored in separate files (i.e., Excel or CSV) and linked to the simulation model. This Simio capability makes the simulation modeling process seamless, accurate, and efficient. The data tables can include a wide range of information for resources, materials, orders, dispatching rules, labor, schedules, entities, routings networks, etc.

For instance, and by way of example only, the data-table module can also be used as a liaison between the simulation and optimization module. The optimization algorithm designed for this work takes data tables as an entry for the optimization model (decision variable) and tries to find the evolve the table entries and provide the desired solution. Therefore, each of the ERP data tables can be subject to optimization depending on the user's needs. For instance, a user can optimize orders data-table to change order priorities to satisfy objectives. Another example would be optimizing the dispatching rule table to figure out the best set of rules to proceed with operation on the floor. As can be observed, the improvement opportunities with this unique framework are unbounded.

And as another non-limiting example, once the simulation optimization is completed, the optimal results are tabulated in data tables, and then the new results are populated back to the ERP system. At this point, the updated ERP info can be used in the actual system to perform optimally.

Figure 2:
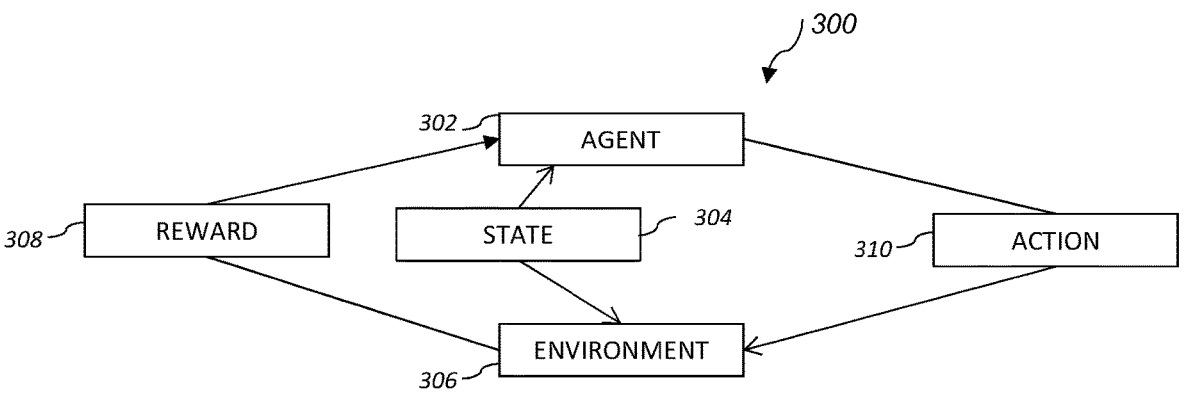
FIG. 2 is a working example of a simulation model using reinforcement learning in accordance with aspects of the disclosure.
Figure 3:
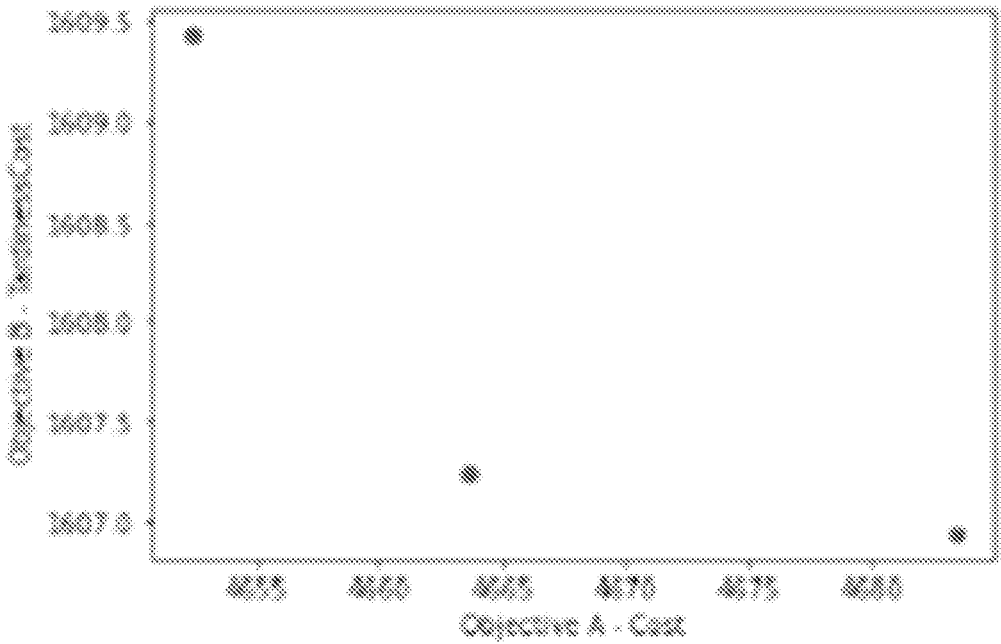
FIG. 3 depicts a Pareto front for a first experiment of the working example of FIG. 2 in accordance with aspects of the disclosure.
Figure 4:
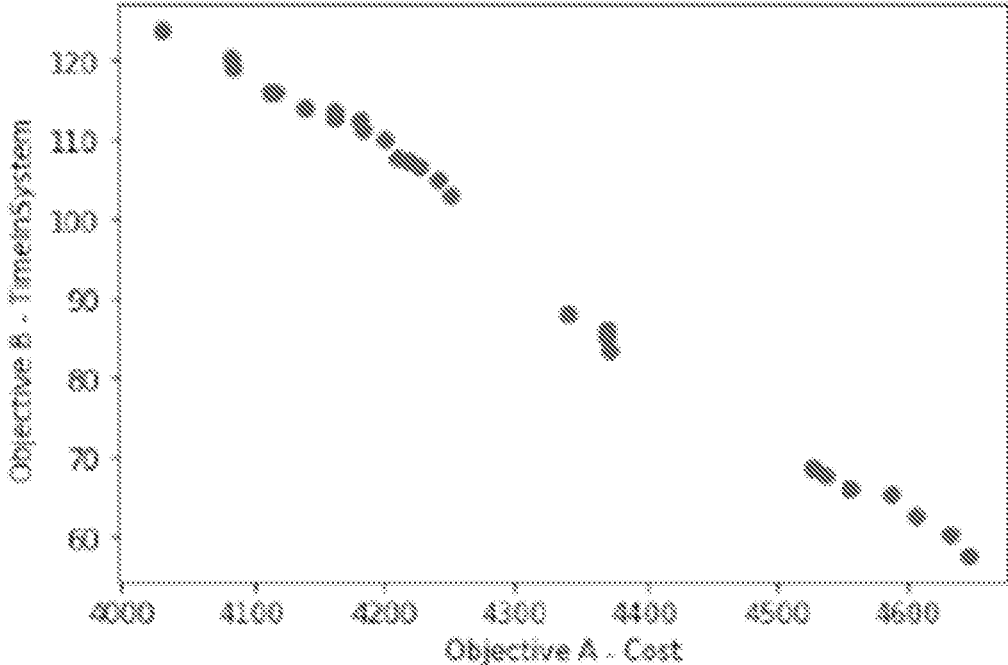
FIG. 4 depicts a Pareto front for a second experiment of the working example of FIG. 2 in accordance with aspects of the disclosure.

Next, Working Example of the techniques described above with respect to FIGS. 1A & 1B shall be presented with respect to FIGS. 2-4. FIG. 2 depicts an example reinforcement learning model 300. Reinforcement learning model 300 includes an agent block 302, a state block 304, an environment block 306, a reward block 308 and action block 310. For instance, agent block 302 takes an action at action block 310 within the context of environment block 306 leading to a state block 304 reflecting a change of state. Reward block 308 rewards the action, and the reward and state is fed back to agent block 302, which continues. During iteration of model 300, the agent block 302 learns through reinforcement learning which actions are preferred based on the reward.

Using reinforcement learning model 300, the proposed SODT framework of the Working Example was implemented and verified with a case study of the Beverage Production unit. The model was built using Simio Enterprise Edition to simulate a batch processing system that mixes and fills a beverage product. The model is capable of imitating the real-life scenarios as the inputs to the model can be dynamically changed by altering values in a table. These tables can be linked to the ERP database to continually update the input parameters of the model. Furthermore, the reinforcement learning model 300, which is shown in FIG. 2, is capable of completely implementing all the real-life constraints of the resources to provide realistic operating scenarios.

In the Working Example of FIGS. 2-4, the three types of manufactured material—Green Bulk, Red Bulk, and Blue Bulk are mixed in available Mixing machines and later directed to the available Tanks. The finished good materials are first directed to the Filler machines and are later packed in the Packing Machines. The model also takes into consideration the requirements of Raw materials, such as bottles and labels, that are needed during the production process. It is imperative that the workers and manufacturing material are available at each step/machine to ensure smooth execution. The model is enhanced by implementing Simio's custom dashboard features that display material, order details, and dispatch lists for use by operators. The model is simulated to generate a 30-day Operation Planning and Production Schedule based on the input orders, their attributes, resource constraints, and time availability. The following parameters were captured for the experimental analysis—Total Cost of operations, Tardiness Cost—corresponding to the late orders, Average Lateness, Number of late orders, and average time in the system.

In the Working Example of FIGS. 2-4, the efficiency of any production unit is highly dependent on the resource utilization and production schedule in execution. Following that, the model was tested for multiple scenarios by altering the availability of operators and dispatching rules for different processes. The production unit is designed to work in 3 shifts—with each shift requiring operators according to the production schedule. A set for four dispatching rules—Least Setup Time, Earliest Due Date, Largest Priority Value, and Largest Attribute Value can be applied in different permutations to the Mixing and Packing operations. The Mixing Selection Rule represents the order of dispatching rules for processing Mixing and Tank Fill operations. Similarly, the Packing Selection Rule—represents the order of dispatching rules for Pilling and Packing operations. Hence, the number of operators in the shift and sequence of dispatching rules were selected as Decision variables to analyze its effect on Total manufacturing Cost and Tardiness Cost. In one embodiment of the analytics system 130 of FIG. 1A, the SODT framework used a multi-object genetic algorithm, such as non-dominated sorting genetic algorithm II (NSGA-II) as a Multi-Objective Metaheuristic algorithm to evaluate the effect of change in the number of workers in each shift and sequence of dispatching rules on Total Manufacturing Cost and Tardiness Cost. NSGA-II is known to a person of ordinary skill in the art.

The NSGA-II initiates with a population that represents different number of operators in the shift and sequence of dispatching rules. The algorithm then investigates the trade-off between different objectives. When one objective cannot be improved without the worsening of another objective, we are on what is known as the 'Pareto front'.

FIGS. 3 and 4 show the Pareto Front graph that was obtained from two different experimental analyses. The objectives selected for the first experiment (Experiment 1) were Total Cost and Tardiness Cost. Upon analyzing a set of 400 population 3 Pareto front solutions were obtained as seen in FIG. 3. With reference to the following Table 1, we can observe that there is a lesser deviation in Tardiness Cost among the Pareto Solutions but the Total cost has a considerable deviation. Achieving a small deviation in the tardiness cost can be attributed to the smart permutations of dispatching rules and balancing the number of operators in each shift. Given the due dates of the orders remain the same, these Pareto solutions could help the decision-makers to perform a trade-off between operator availability and Total Cost by merely altering the dispatching logic of the system.

In the Working Example of FIGS. 2-4, another experiment was run to test the obvious relation between Total Cost and entity's Time in the system. Upon analyzing a set of 300 population, 27 Pareto solutions were found. As seen in Table 2, the given model presents a considerable variation in near-optimum solution to perform a trade-off between given objectives. Table 2 gives a glimpse of Pareto solutions obtained for this experiment (Experiment 2). The values displayed in the table represent the extremes and center point of the Pareto graph. Following are the abbreviations used for the dispatching rules—Largest Attribute Value—LAV, Earliest Due Date—EDD, Least Setup Time—LST, Largest Priority Value—LPV.

In the Working Example of FIGS. 2-4, there is demonstrated a successful implementation of the Simulation-optimization framework for the Digital Twin model of a Beverage Manufacturing Plant. The DT model is more than just a virtual representation as it integrates real-time data tables to build the simulation environment. The SODT framework is not only capable of harnessing the power of simulation engine but also capable of simultaneously optimizing the search space. The proposed approach can help maximize the utilization and efficiency of the plant by continually optimizing the DT model. With the help of Multi-Objective pareto front obtained from the SODT framework, decision makers can have a clearer picture of the production schedule in execution. The proposed SODT framework has the ability of rapidly adapt to the changes in orders, perform iterative optimization and analyze multiple scenarios to provide essential feedback.

The following listed references, some of which are referred to above, represent the state of the art, each of which are herein incorporated by reference in their entirety:

Al-Ali, A., R. Gupta, T. Zaman Batool, T. Landolsi, F. Aloul, and A. Al Nabulsi. 2020. "Digital Twin Conceptual Model within the Context of Internet of Things". Future Internet 12 (10):163.

Balderas, D., A. Ortiz, E. Méndez, P. Ponce, and A. Molina. 2021. "Empowering Digital Twin for Industry 4.0 using metaheuristic optimization algorithms: case study PCB drilling optimization". The International Journal of Advanced Manufacturing Technology 113 (5):1295-1306.

Ding, K., F. T. Chan, X. Zhang, G. Zhou, and F. Zhang. 2019. "Defining a digital twin-based cyber-physical production system for autonomous manufacturing in smart shop floors". International Journal of Production Research 57 (20):6315-6334.

Gyulai, D., J. Bergmann, A. Lengyel, B. Kádár, and D. Czirkó. 2020. "Simulation-based Digital Twin of a Complex Shop-Floor Logistics System". In 2020 Winter Simulation Conference (WSC), 1849-1860. IEEE

TABLE 1

| | | | Number of | | |
|---|---|---|---|---|---|
| | | Tardiness | Operator at | Sequence of Packing | Sequence of Mixing |
| Solution | Cost | Cost | Shift- 1, 2, 3 | Dispatching Rule | Dispatching Rule |
| Solution 1 | 4652.34 | 1609.42 | 2, 4, 4 | LAV, LAST, EDD, LPV | LPV, LSP, LAV, EDD |
| Solution 2 | 4663.60 | 1607.24 | 4, 3, 5 | LST, EDD, LPV, LAV | LPV, LST, LAV, EDD |
| Solution 3 | 4683.40 | 1606.93 | 5, 5, 5 | LAV, LST, EDD, LPA | LPV, LST, LAV, EDD |

Results for Experiment 1

TABLE 2

| | | | Number of | | |
|---|---|---|---|---|---|
| | | Tardiness | Operator at | Sequence of Packing | Sequence of Mixing |
| Solution | Cost | Cost | Shift- 1, 2, 3 | Dispatching Rule | Dispatching Rule |
| Solution 1 | 4084.81 | 119.12 | 1, 2, 3 | LAV, EDD, LAT, LPV | EDD, LST, LAV, LPV |
| Solution 2 | 4339.74 | 88.12 | 1, 2, 1 | EDD, LAV, LST, LPV | LPV, LAV, LST, EDD |
| Solution 3 | 4646.05 | 57.61 | 3, 4, 3 | LST, LPV, LAV, EDD | LST, LPV, LAV, EDD |

Results for Experiment 2

In the Working Example of FIGS. 2-4, the proposed SODT is a promising approach that can be extended to various future works. The experimentation example solely focused on the dispatching and labor tables. In fact, the used simulation model is developed using multiple input tables and each of these tables can subject to optimization. One interesting extension is to optimize order schedules and improve their release time to the manufacturing floor. Another example would be analyzing the impact of layout changes on the model. Since all resources are listed in a table, their coordinates can be easily changed in order to make new layouts. This experimentation can be done without manual intervention or sophisticated layout design software packages. The SODT model can develop multiple layouts based on the user expectation and evaluate them instantaneously. Another important advantage of this model is its capability to capture unexpected events on the real-world system and provide immediate responses. Other analyses could include studying the effect of machine failures, and new project/order arrivals using the SODT model. The proposed SODT is very promising and leads to numerous future works.

He, B., and K.-J. Bai. 2020. "Digital twin-based sustainable intelligent manufacturing: a review". Advances in Manufacturing:1-21.

Kritzinger, W., M. Karner, G. Traar, J. Henjes, and W. Sihn. 2018. "Digital Twin in manufacturing: A categorical literature review and classification". IFAC-PapersOnLine 51 (11):1016-1022.

Kunath, M., and H. Winkler. 2018. "Integrating the Digital Twin of the manufacturing system into a decision support system for improving the order management process". Procedia Cirp 72:225-231.

Leng, J., D. Yan, Q. Liu, H. Zhang, G. Zhao, L. Wei, D. Zhang, A. Yu, and X. Chen. 2019. "Digital twin-driven joint optimisation of packing and storage assignment in large-scale automated high-rise warehouse product-service system". International Journal of Computer Integrated Manufacturing:1-18.

Liu, M., S. Fang, H. Dong, and C. Xu. 2020. "Review of digital twin about concepts, technologies, and industrial applications". Journal of Manufacturing Systems.

Liu, Z., W. Chen, C. Zhang, C. Yang, and Q. Cheng. 2021. "Intelligent scheduling of a feature-process-machine tool supernetwork based on digital twin workshop". Journal of Manufacturing Systems 58:157-167.

Park, K. T., S.-W. Jeon, and S. D. Noh. 2021. "Digital twin application with horizontal coordination for reinforcement-learning-based production control in a re-entrant job shop". International Journal of Production Research:1-17.

Santos, R., J. Basto, S. G. Alcalá, E. Frazzon, and A. Azevedo. 2019. "Industrial IoT integrated with simulation-A digital twin approach to support real-time decision making". In Proceedings of the International Conference on Industrial Engineering and Operations Management, July, 23-26.

Zhang, L., L. Zhou, and B. K. Horn. 2021. "Building a right digital twin with model engineering". Journal of Manufacturing Systems 59:151-164.

Zhang, M., F. Tao, and A. Nee. 2021. "Digital twin enhanced dynamic job-shop scheduling". Journal of Manufacturing Systems 58:146-156.

Zhang, Z., Z. Guan, Y. Gong, D. Luo, and L. Yue. 2020. "Improved multi-fidelity simulation-based optimisation: application in a digital twin shop floor". International Journal of Production Research:1-20.

Zheng, Y., S. Yang, and H. Cheng. 2019. "An application framework of digital twin and its case study". Journal of Ambient Intelligence and Humanized Computing 10 (3): 1141-1153.

Cheng, R. C. H. 1994. "Selecting Input Models". In Proceedings of the 1994 Winter Simulation Conference, edited by J. D. Tew, M. Manivannan, D. A. Sadowski, and A. F. Seila, 184-191. Piscataway, N.J.: Institute of Electrical and Electronics Engineers, Inc.

Chien, C. 1989. "Small Sample Theory for Steady State Confidence Intervals". Technical Report No. 37, Department of Operations Research, Stanford University, Stanford, California.

Gupta, S. S., K. Nagel, and S. Panchapakesan. 1973. "On the Order Statistics from Equally Correlated Normal Random Variables". Biometrika 60 (2):403-413.

Hammersley, J. M., and D. C. Handscomb. 1964. Monte Carlo Methods. London: Methuen.

Law, A. M., and W. D. Kelton. 2000. Simulation Modeling & Analysis. 3rd ed. New York: McGraw-Hill, Inc.

Powell, J. H., and N. Mustafee. 2017. "Widening Requirements Capture with Soft Methods: An Investigation of Hybrid M&S Studies in Healthcare". Journal of the Operational Research Society 68 (10):1211-1222.

Rabe, M., F. Dross, and A. Wuttke. 2017. "Combining a Discrete-event Simulation Model of a Logistics Network with Deep Reinforcement Learning". In Proceedings of the MIC and MAEB 2017 Conferences, July 4th-7th, Barcelona, Spain, 765-774.

Schruben, L. W. 1979. "Designing Correlation Induction Strategies for Simulation Experiments". In Current Issues in Computer Simulation, edited by N. R. Adam and A. Dogramaci, 235-256. New York: Academic Press.

Sharon Parq Associates. 2018. WordTips: Numbering Equations. http://word.tips.net/Pages/T000273_Numbering_Equations.html, Steiger, N. M. 1999. Improved Batching for Confidence Interval Construction in Steady-State Simulation. Ph.D. thesis, Department of Industrial Engineering, North Carolina State University, Raleigh, North Carolina.

Embodiments of the present disclosure may include a system, a method, and/or a computer program product. The computer program product may include a computer readable storage medium (or media) having computer readable program instructions thereon for causing a processor to carry out aspects of set forth herein.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the certain embodiments may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects set forth herein.

Embodiments are described herein with reference to flowchart illustrations and/or block diagrams of methods, apparatus (systems), and computer program products according to embodiments. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

What is claimed is:

1. A machine learning system for optimizing a production process, the machine learning system comprising:

a production planning system, the production planning system comprising real-time data of the production process;

a simulation system, the simulation system configured with a digital model of the production process, the digital model accepting a plurality of input parameters and producing a plurality of output parameters;

an analytics system, the analytics system configured to interface with the simulation system, wherein the simulation system interfaces with the analytics system using an application programming interface, the application programming interface including commands for providing the plurality of input parameters and receiving the plurality of output parameters, wherein the analytics system communicates different values for the plurality of input parameters to the simulation system using the application programming interface, wherein the simulation system runs the digital model using the different values for the plurality of input parameters received from the analytics system and at least some of the real-time data of the production process received from the production planning system, wherein the simulation system communicates the plurality of output parameters to the analytics system, wherein the analytics system analyzes the plurality of output parameters to learn an optimized plurality of input parameters corresponding to the plurality of output parameters, and wherein the production planning system is programmed to use the optimized plurality of input parameters learned using the digital model to run the production process.

2. The machine learning system of claim 1, wherein the real-time data of the production planning system is stored using data tables, and the simulation system links to the data tables of the production planning system.

3. The machine learning system of claim 1, wherein the analytics system applies a dispatching rule to optimize the simulation, the dispatching rule being one of a least setup time, earliest due date, largest priority value or largest attribute value rule.

4. The machine learning system of claim 1, wherein the machine learning system iteratively optimizes the production process by the simulation system iteratively running the digital model responsive to the different values for the plurality of input parameters from the analytics system.

5. The machine learning system of claim 1, wherein the analytics system learns the optimized plurality of input parameters corresponding to the plurality of output parameters using reinforcement learning.

6. The machine learning system of claim 1, wherein the production planning system, simulation system and analytics system communicate using an application programming interface using a C# programming language.

7. The machine learning system of claim 1, wherein the analytics system comprises a multi-objective genetic algorithm.

8. The machine learning system of claim 7, wherein the multi-objective genetic algorithm comprises a non-dominated sorting genetic algorithm.

* * * * *